United States Patent [19]
Kim et al.

[11] Patent Number: 6,097,457
[45] Date of Patent: Aug. 1, 2000

[54] LIQUID CRYSTAL DISPLAY

[75] Inventors: Byeong Koo Kim; Yong Min Ha, both of Kyongki-do, Rep. of Korea

[73] Assignee: LG Electronics Inc., Seoul, Rep. of Korea

[21] Appl. No.: 09/132,443

[22] Filed: Aug. 11, 1998

[30]     Foreign Application Priority Data

Aug. 11, 1997  [KR]  Rep. of Korea ................... 97-38198

[51] Int. Cl.⁷ .................................................. G02F 1/1333
[52] U.S. Cl. .......................................... 349/110; 349/151
[58] Field of Search .................................. 349/110, 111, 349/151

[56]           References Cited

U.S. PATENT DOCUMENTS 5,617,230   4/1997   Ohgawara et al. ................... 349/110
5,745,202   4/1998   Yamauchi et al. ................... 349/110
5,850,275  12/1998   Watanabe et al. ................... 349/110
5,910,829   6/1999   Shimada et al. .................... 349/110

FOREIGN PATENT DOCUMENTS 04194823   7/1992   Japan .

*Primary Examiner*—William L. Sikes
*Assistant Examiner*—James A. Dudek
*Attorney, Agent, or Firm*—Long Aldridge & Norman LLP

[57]           ABSTRACT

A liquid crystal display includes a first substrate including a driver circuit having a plurality of driver wires and a pixel element array portion, a second substrate including a light-shielding layer and a color filter, and a liquid crystal material interposed between the first and second substrates, the light-shielding layer being formed to overlap with the drive wires with a minimum area.

18 Claims, 4 Drawing Sheets

LIQUID CRYSTAL DISPLAY

This application claims the benefit of Korean Application No. 97-38198, filed on Aug. 10, 1998, which is hereby incorporated by reference.

BACKGROUND OF THE INVENTION

1. Field of the Invention

The present invention relates to a Liquid Crystal Display ("LCD") and, more particularly, to an LCD having a light-shielding layer which is formed to overlap the wires of driver circuits with a minimum overlapping area.

2. Discussion of the Related Art

FIG. 1 shows a schematic view of a prior art LCD. An example is taken of an LCD where a light-shielding layer is formed on a color filter substrate.

Generally, a thin film transistor-LCD ("TFT-LCD") has a structure where a liquid crystal material 15 is interposed between a TFT array substrate (hereinafter referred to as "lower substrate") 10 and a color filter substrate (hereinafter referred to as "upper substrate") 20.

The lower substrate 10 has a centrally formed pixel element array portion 13, a gate driver circuit 12 and a data driver circuit 11, where the gate and data driver circuits 12 and 11 are disposed on the left and upper sides of the pixel element array portion 13, respectively. The gate driver circuit 12 drives the pixel elements of the pixel element array portion 13 and the data driver circuit 11 applies data signals to the pixel elements. Both of the driver circuits 12 and 11 are electrically connected to the pixel element array portion 13, respectively. The driver circuits 12 and 11 are also connected to an external circuit (not shown) to transfer signals of the external circuit to the pixel elements.

Although not shown in the figure, a plurality of gate and data lines are alternately arranged in the pixel array portion 13 to provide a plurality of pixel elements in a form. A transistor and a transparent pixel electrode electrically connected to driver circuits 12 and 11 are formed in each pixel element. In this respect, each driver circuit is connected to the external circuit so as to transfer the signals from the external circuit to the pixels.

The upper substrate has a plurality of color filters (not shown) having red, green and blue filters, respectively. Each color filter is formed corresponding to one of the pixel elements. A light-shielding layer 21 consisting of a metal, such as chrome, is disposed in a region between the color filters, that is, corresponding to a region of a metal pattern in the lower substrate, such as the data bus line, the gate bus line, and the thin-film transistor. A protective layer covers the surface of the color filter and the light-shielding layer. A common electrode for applying the electric field to the liquid crystals is formed on the protective layer. The figure shows the pattern of light-shielding layer 21 as a principal part for explaining the upper substrate.

The light-shielding layer 21 is so formed as to cover a region corresponding to the metal pattern, such as data bus line, the gate bus line, and the thin-film transistor of the lower substrate, thereby preventing light from leaking through regions other than the transparent pixel electrode. The light-shielding layer 21 has a pattern flat covers die whole area other tan the transparent pixel electrode of the lower substrate, so that it is formed in a matrix at a position corresponding to the pixel element array portion of the lower substrate.

FIG. 2 is a schematic view of the LCD taken by superposing area A onto area A' of FIG. 1, to explain how the wires of the driver circuit and the light-shielding layer overlap with each other.

The driver wire 11-1, 11-2, 11-3 and 11-4 are arranged at predetermined intervals in the driver circuit of the lower substrate. The light-shielding layer 21 is formed on the upper substrate to cover the whole area of the driver wires of the driver circuit.

In the prior art structure described above, the driver wires overlap with the light-shielding layer to form a capacitive coupling. The capacitive coupling refers to a phenomenon in which an insulating material is interposed between two electrodes mutually corresponding to each other and the signals of the one electrode affect those of the other. In the prior art, the driver signals applied to the driver wires of the driver circuit are distorted due to a capacitance formed by the driver wires and the light-shielding layer.

FIG. 3 is a partial equivalent circuit diagram of the driver wires and the light-shielding layer, where coupling capacitances are caused by the light-shielding layer of the upper substrate and the driver wires 11-1 and 11-2 of the driver circuit of the lower substrate.

In FIG. 3, C11, C12, C13, C14, . . . indicate the capacitances due to the light-shielding layer 21 and the first driver wire 11-1 while C21, C22, C23, C24, . . . indicate the capacitances due to the light-shielding layer 21 and the second driver wire 11-2. Although not shown in the figure, the other bus lines and the light-shielding layer also form capacitances.

The coupling capacitances are insignificant in a small to medium-sized panel or a low resolution panel and minimally affect the LCD, but those arising in a large-sized, high resolution panel are large enough to distort or delay the signals applied to the driver wires. This results from an increase in the length and size of the driver wires with the larger panel. Consequently, it is desirable to form the driver wires having a conductive material with low resistance or to design the structure of the driver wires of the driver circuits to have a reduced capacitive coupling.

Accordingly, the present invention is directed to an liquid crystal display that substantially obviates one or more of the problems due to limitations and disadvantages of the prior art.

An object of the present invention is to prevent distortion of driver signals applied to driver wires by optimizing the pattern of a light-shielding layer to reduce capacitive coupling caused by an overlap of the driver wires and the light-shielding layer to a minimum.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display comprises a first substrate including a driver circuit having a plurality of driver wires and a pixel element array portion, a second substrate including a light-shielding layer and a color filter, and a liquid crystal material interposed between the first and second substrates, wherein the light-shielding layer is formed to overlap with the driver wires with a minimum area.

In another aspect of the present invention, a liquid crystal display comprises a first substrate including a driver circuit having a plurality of driver wires and a pixel element array; a second substrate including a light-shielding layer and a color filter, and a liquid crystal material between the first and second substrates, wherein the light-shielding layer overlaps the driver wires with a minimum area.

In another aspect of the present invention, a liquid crystal display comprises a first substrate including a driver circuit having a plurality of driver wires and a pixel element array; a second subs including a light-shielding layer and a color filter; and a liquid crystal material between the first and second substrates, wherein the light-shielding layer overlapping the driver wires includes strands of light-shielding material having a gap between at least two strands.

In another aspect of the present invention, a method of forming a liquid crystal display comprises forming a first substrate including a driver circuit having a plurality of driver wires and a pixel element array; forming a second substrate including a light-shielding layer and a color filter; and forming a liquid crystal material between the first and second substrates, wherein the light-shielding layer is formed to overlap the driver wire with a minimum area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF PREFERRED EMBODIMENT

Reference will now be made in detail to the preferred embodiments of the present invention, examples of which are illustrated in the accompanying drawings.

Figure 1:
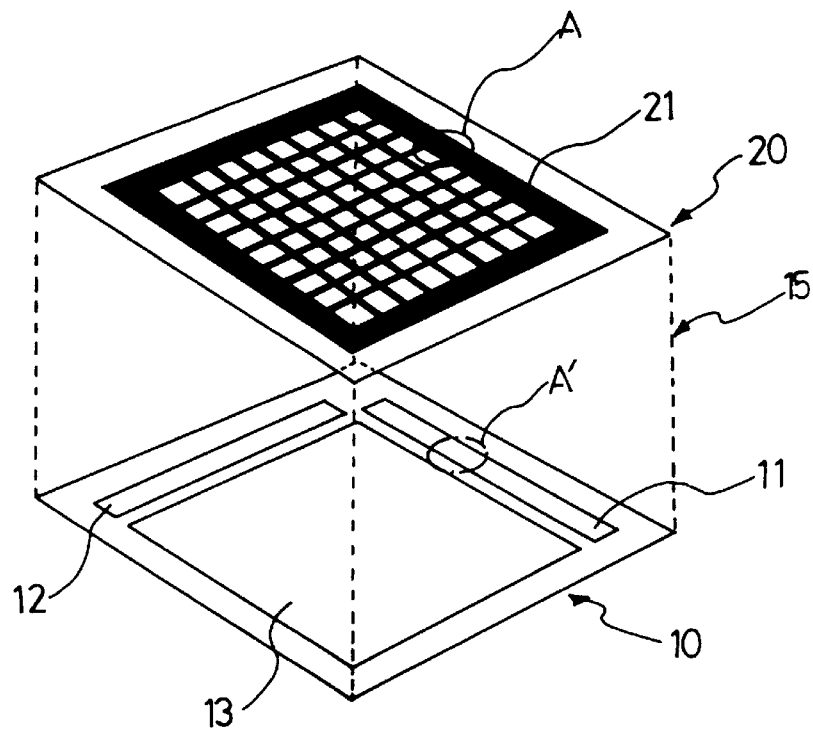
FIG. 1 is a schematic view of a conventional LCD.
Figure 2:
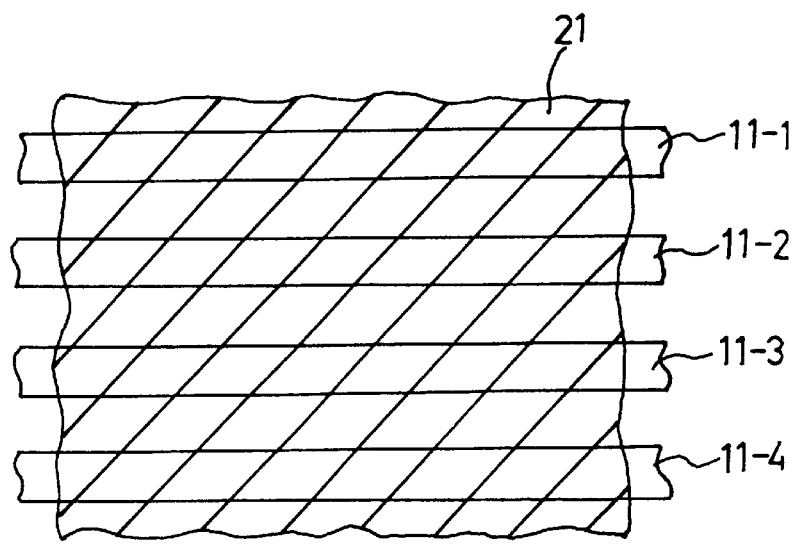
FIG. 2 is a schematic view taken by superposing area A onto area A' of FIG. 1, for explaining how driver wires and a light-shielding layer overlap each other.
Figure 3:
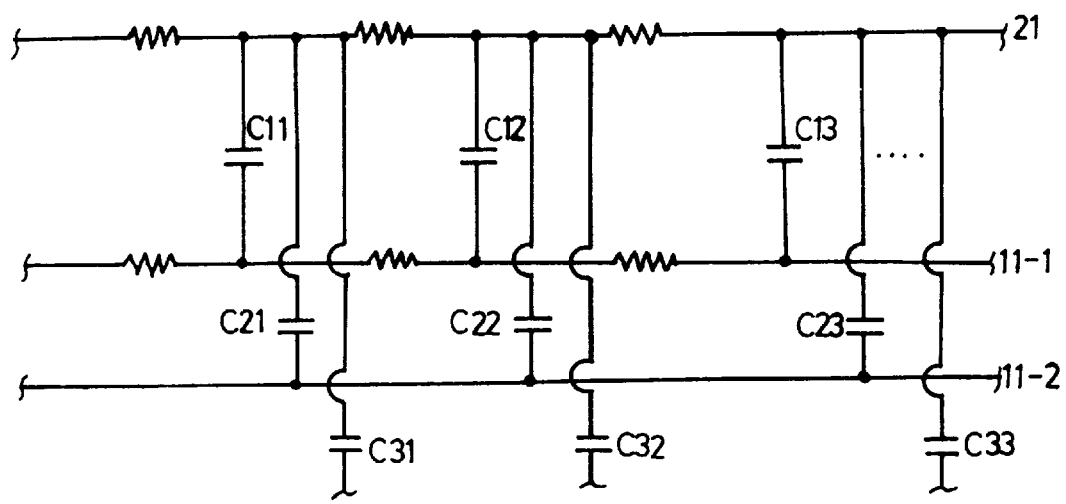
FIG. 3 is a partial equivalent circuit diagram of the driver wires and the light-shielding layer shown in FIG. 2.
Figure 4:
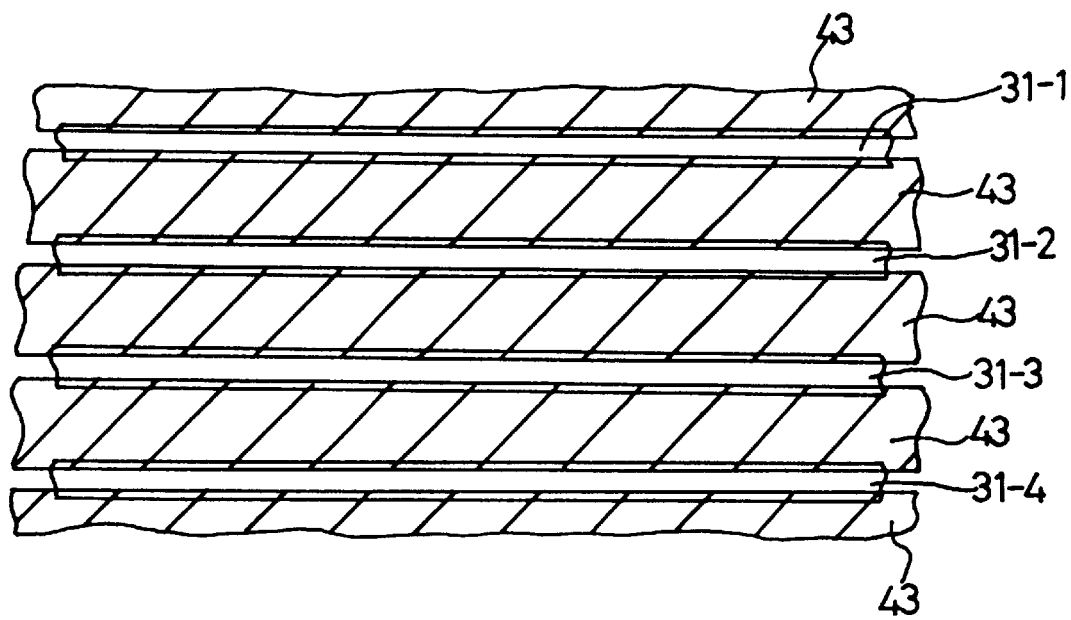
FIG. 4 is a view illustrating how a light-shielding layer with an improved pattern overlaps the driver wires of the driver circuit in accordance with the present invention.

FIG. 4 is a schematic view of an LCD in accordance with the present invention, illustrating how driver wires of a driver circuit of the lower substrate overlap with a light-shielding layer of the upper substrate.

The driver wires 31-1, 31-2, 31-3 and 31-4 are arranged at predetermined intervals in the driver circuit of the lower substrate. The light-shielding layer 43 is formed by a conductive material such as Cr. The light-shielding layer 43 covers regions between a plurality of driver wires 31-1, 31-2, 31-3 and 31-4 to overlap the driver wires of the driver circuits with a minimum area, This structure minimizes the overlap between the light-shielding layer and the driver wires of the driver circuit. Accordingly, it is possible to reduce the coupling capacitance caused by the overlap, thereby minimizing the signal distortion and delay of the driver circuits.

Preferably, the light-shielding layer 43 is disposed in only regions between the plurality of driver wires 31-1, 31-2, 31-3 and 31-4 without overlapping the driver wires. However, a substantial overlapping between the light-shielding layer and driver wires may occur. Accordingly, a light-shielding layer is preferably formed to overlap the driver wires of driver circuits with a minimum overlapping area in such instances.

Figure 5:
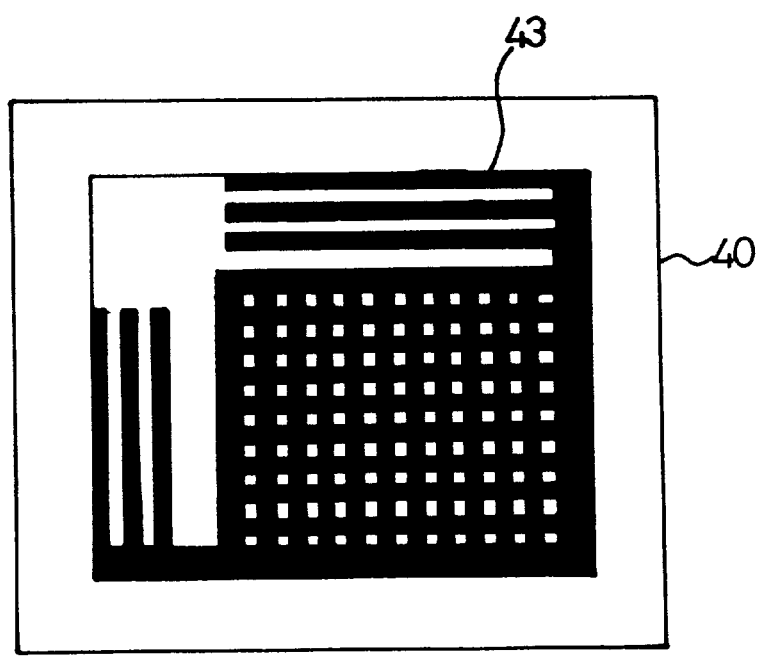
FIG. 5 is a view showing a pattern of the light-shielding layer only on the upper substrate in an LCD according to the present invention.

FIG. 5 is a schematic view of a pattern of the light-shielding layer of the upper substrate according to the present invention.

In a region corresponding to a pixel element array portion of the lower substrate, the light-shielding layer 43 preferably covers the whole area other than the plurality of transparent pixel electrodes. Thus, a plurality of open windows are formed in the matrix based on the arrangement of pixel elements of the lower substrate.

In a region corresponding to the driver circuits of the lower substrate, the light-shielding layer 43 covers regions between a plurality of driver wires 31-1, 31-2, 31-3 and 31-4, thereby overlapping the driver wires of the driver circuits with a minimum area. The light-shielding layer 43 is provided with a long open window pattern. The light-shielding layer 43 is preferably patterned to cover only the region between metal driver wires of the driver circuits, gate, or data driver circuits.

Regions which arm not protected by the light-shielding layer 43 include the transparent pixel electrodes of the pixel element array portion and a region between the driver wires of the driver circuit.

Figure 6:
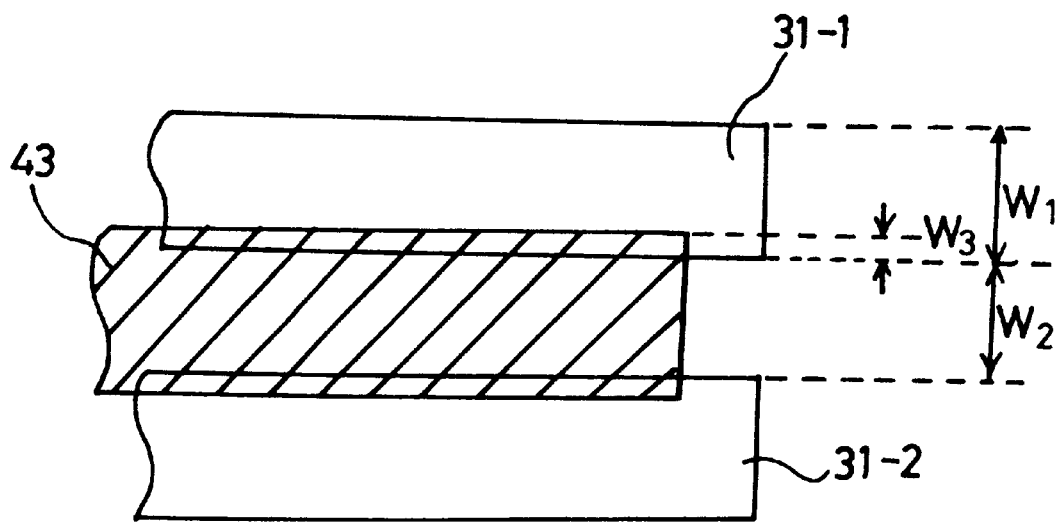
FIG. 6 illustrates a portion of the light-shielding layer overlapping the driver wires.

FIG. 6 shows a portion of the overlapping region of the light-shielding layer and the driver wire. Referring to FIG. 6, the driver wires 31-1 and 31-2 overlap a portion or strand of the light-shielding layer 43. Unlike the prior art devices, the light-shielding layer 43 does not completely overlap the driver wires, i.e., only a portion of a driver wire is overlapped by the stand of the light-shielding layer. For example, the overlapping portion may be 5% of the width of the wire. The width $W_1$ of the driver wire is preferably from several tens to several hundreds of micrometers, and the interval $W_2$ between the wires (31-1 and 31-2, for example) is preferably several tens of micrometers. For example, if the width of the wire is 100 μm, then thc overlapping region $W_3$ is about 5 μm.

The structure according to the present invention minimizes the overlap between the light-shielding layer and the driver wires in the driver circuit. Accordingly, it is possible to reduce the coupling capacitance caused by the overlap between the light-shielding layer and the driver wires in the driver circuit.

As described in the present invention, coupling capacitance can be reduced by forming a pattern of the light-shielding layer to have a minimal overlap with the driver wins, thereby minimizing signal distortion and delay in the LCD.

What is claimed is:

1. A liquid crystal display, comprising:
   a first substrate including a driver circuit having a plurality of driver wires and a pixel element array;
   a second substrate including a light-shielding layer and a color filter; and a liquid crystal material between the first and second substrates, wherein the light-shielding layer overlaps the driver wires and includes strands of light-shielding material having a gap between at least two strands.

2. A liquid crystal display according to claim 1, wherein the light-shielding layer overlaps the driver wires with a minimum area.

3. A liquid crystal display according to claim 1, wherein the light-shielding layer covers regions between the driver wires of the driver circuit.

4. A liquid crystal display according to claim 1, wherein an overlapping portion between one of the strands of the light-shielding material and one of the driver wires is less than 50% of the width of the one of the driver wires.

5. A liquid crystal display according to claim 1, wherein an overlapping portion between one of the strands of the light-shielding material and one of die driver wires is less than 50% of the width of the one of the strands.

6. A liquid crystal display according to claim 1, wherein the light-shielding layer overlaps the driver wires with a minimum area;

the light-shielding layer covers regions between the driver wires of the driver circuit;

an overlapping portion between one of the stands of the light-shielding material and one of the driver wires is less than 50% of the width of the one of the driver wires;

the overlapping portion between one of the strands of the light-shielding material and one of the driver wires is less than 50% of the width of the one of the stands; and the light-shielding layer covers an arm other than a plurality of transparent pixel electrode in a region corresponding to a pixel element array of the first substrate.

7. A liquid crystal display according to claim 1, wherein each of the driver wires has inner and outer edges with respect to one strand of the light-shielding material in a lengthwise direction, the one strand of the light-shielding material having a width smaller than a distance between outer edges of two driver wires adjacent the one strand.

8. A liquid crystal display according to claim 1, wherein the light shielding layer covers an area other than a plurality of transparent pixel electrodes in a region corresponding to the pixel element array of the first substrate.

9. A liquid crystal display according to claim 2, wherein an overlapping portion between one of the strands of light-shielding material and one of the driver wires is about 5% of a width of the driver wire.

10. A method of forming a liquid crystal display, comprising:

forming a first substrate including a driver circuit having a plurality of driver wires and a pixel element array;

forming a second substrate including a light shielding layer and a color filter; and forming a liquid crystal material between the first and second substrates, wherein the light-shielding layer overlaps the driver wires and includes strands of light-shielding material having a gap between at least two strands.

11. A method according to claim 10, wherein the light-shielding layer overlaps the driver wires with minimum area.

12. A method according to claim 10, wherein an overlapping portion between one of the strands of the light-shielding material and one of the driver wires is less than 50% of the width of the one of the driver wires.

13. A method according to claim 10, wherein an overlapping portion between one of the strands of the light-shielding material and one of the driver wires is less than 50% of the width of the one of the strands.

14. A method according to claim 10, wherein the light-shielding layer overlaps the driver wires with a minimum area;

the light-shielding layer covers regions between the driver wires of the driver circuit;

an overlapping portion between one of the strands of the light-shielding material and one of the driver wires is less than 50% of the width of the one of the driver wires;

the overlapping portion between one of the strands of the light-shielding material and one of the driver wires is less than 50% of the width of the one of the strands; and the light-shielding layer covers an area other than a plurality of transparent pixel electrodes in a region corresponding to a pixel element array of the first substrate.

15. A method according to claim 10, wherein the light-shielding layer covers regions between the driver wires of the driver circuit.

16. A method according to claim 10, wherein the light-shielding layer covers an area other than a plurality of transparent pixel electrodes in a region corresponding to a pixel element array of the first substrate.

17. A method according to claim 10, wherein each of the driver wires has inner and outer edges with respect to one strand of the light-shielding material in a lengthwise direction, the one strand of the light-shielding material having a width smaller than a distance between outer edges of two driver wires adjacent the one strand.

18. A method according to claim 11, wherein an overlapping portion between one of the strands of light-shielding material and one of the driver wires is about 5% of a width of the driver wire.

* * * * *